(12) United States Patent
Sasina et al.

(10) Patent No.: US 8,931,584 B2
(45) Date of Patent: Jan. 13, 2015

(54) THERMAL EXPANSION RESISTANT HEAT EXCHANGER SEAL

(75) Inventors: Matthew Sasina, Farmington Hills, MI (US); Alfred Piggott, Redford, MI (US)

(73) Assignee: DENSO International America, Inc., Southfield, MI (US)

( * ) Notice: Subject to any disclaimer, the term of this patent is extended or adjusted under 35 U.S.C. 154(b) by 698 days.

(21) Appl. No.: 13/008,058

(22) Filed: Jan. 18, 2011

(65) Prior Publication Data
US 2011/0240388 A1 Oct. 6, 2011

Related U.S. Application Data

(60) Provisional application No. 61/319,766, filed on Mar. 31, 2010.

(51) Int. Cl.
*B60K 11/04* (2006.01)
*F28F 9/00* (2006.01)

(52) U.S. Cl.
CPC . *F28F 9/00* (2013.01); *B60K 11/04* (2013.01); *F28F 2265/26* (2013.01); *F28F 2230/00* (2013.01)
USPC .............................................. 180/68.4; 165/9

(58) Field of Classification Search
USPC ........ 180/68.4; 165/9, DIG. 20; 277/549, 550
See application file for complete search history.

(56) References Cited

U.S. PATENT DOCUMENTS

| 6,457,543 | B1 * | 10/2002 | Wooldridge | 180/68.4 |
|---|---|---|---|---|
| 6,901,992 | B2 * | 6/2005 | Kent et al. | 165/67 |
| 7,231,958 | B1 * | 6/2007 | Kaser et al. | 165/9 |
| 8,505,923 | B2 * | 8/2013 | Ferryman et al. | 277/355 |
| 2001/0004010 | A1 * | 6/2001 | Halm | 165/67 |
| 2001/0040021 | A1 * | 11/2001 | Avequin et al. | 165/67 |
| 2001/0040026 | A1 * | 11/2001 | Halm | 165/153 |

OTHER PUBLICATIONS

Prior art illustration of an intercooler manufactured for YARIS (Toyota) in Europe in 2005.

\* cited by examiner

*Primary Examiner* — J. Allen Shriver, II
*Assistant Examiner* — Bridget Avery
(74) *Attorney, Agent, or Firm* — Harness, Dickey & Pierce, P.L.C.

(57) ABSTRACT

A seal member may include a base portion, a plurality of deflector portions, and an expansion portion. The base portion may include a plurality of tabs adapted to be mounted to a heat exchanger. The plurality of deflector portions may each extending from a corresponding one of the plurality of tabs and manipulate a flow of fluid proximate the heat exchanger. The expansion portion may be disposed between adjacent deflector portions and may be expandable in response to exposure to heat between a first position at which the adjacent deflector portions are a first distance apart from each other and a second position at which the adjacent deflector portions are a second distance apart from each other.

17 Claims, 4 Drawing Sheets

THERMAL EXPANSION RESISTANT HEAT EXCHANGER SEAL

CROSS-REFERENCE TO RELATED APPLICATIONS

This application claims the benefit of U.S. Provisional Application No. 61/319,766, filed on Mar. 31, 2010. The entire disclosure of the above application is incorporated herein by reference.

FIELD

The present disclosure relates to a seal mounted to a heat exchanger.

BACKGROUND

This section provides background information related to the present disclosure and is not necessarily prior art.

Modern vehicles may include a variety of heat exchangers for transferring heat from various fluids that are used within the vehicle to accomplish a variety of tasks. Such tasks may include control a temperature within a cab of the vehicle, cooling an engine or motor, and/or cooling a flow of fluid prior to the fluid entering the engine for combustion to boost an efficiency and/or capacity of the engine, for example. Such heat exchangers may be exposed to a wide range of temperatures which causes the heat exchanger to thermally expand and contract. Accordingly, heat exchangers in vehicles can be provided with features to allow the heat exchanger to expand and contract without exposing the heat exchanger to potentially harmful levels of stress.

SUMMARY

This section provides a general summary of the disclosure, and is not a comprehensive disclosure of its full scope or all of its features.

In one form, the present disclosure provides a seal member that may include a base portion, a plurality of deflector portions, and an expansion portion. The base portion may include a plurality of tabs adapted to be mounted to a heat exchanger. Each of the plurality of deflector portions may extend from a corresponding one of the plurality of tabs and manipulate a flow of fluid proximate the heat exchanger. The expansion portion may be disposed between adjacent deflector portions and may be expandable in response to exposure to heat between a first position at which the adjacent deflector portions are a first distance apart from each other and a second position at which the adjacent deflector portions are a second distance apart from each other.

In another form, the present disclosure provides an assembly that may include a heat exchanger and a member associated with the heat exchanger. The member may include a base portion mounted to an outer perimeter of the heat exchanger and a deflector portion extending from the base portion away from the heat exchanger. The deflector portion may restrict air from flowing through a space adjacent the heat exchanger and direct the air through the heat exchanger.

In yet another form, the present disclosure provides a vehicle that may include a source of rotary motive power, a heat exchanger, a body component, and a seal member. The source of rotary motive power may propel the vehicle. The heat exchanger may be disposed between the source of rotary motive power and a front end of the vehicle. The body component may at least partially house the heat exchanger and may cooperate with the heat exchanger to define a gap therebetween. The seal member may include a plurality of tabs, a plurality of deflector portions, and an accordion portion. The tabs may be mounted to an outer perimeter of the heat exchanger. Each of the deflector portions may extend from a corresponding one of the tabs and away from the heat exchanger. The accordion portion may be disposed between adjacent deflector portions. The accordion portion may expand and contract in response to changes in temperature proximate the heat exchanger to allow relative movement between the adjacent deflector portions. The deflector portions may restrict air from flowing through the gap between the heat exchanger and the body component and force the air through the heat exchanger.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
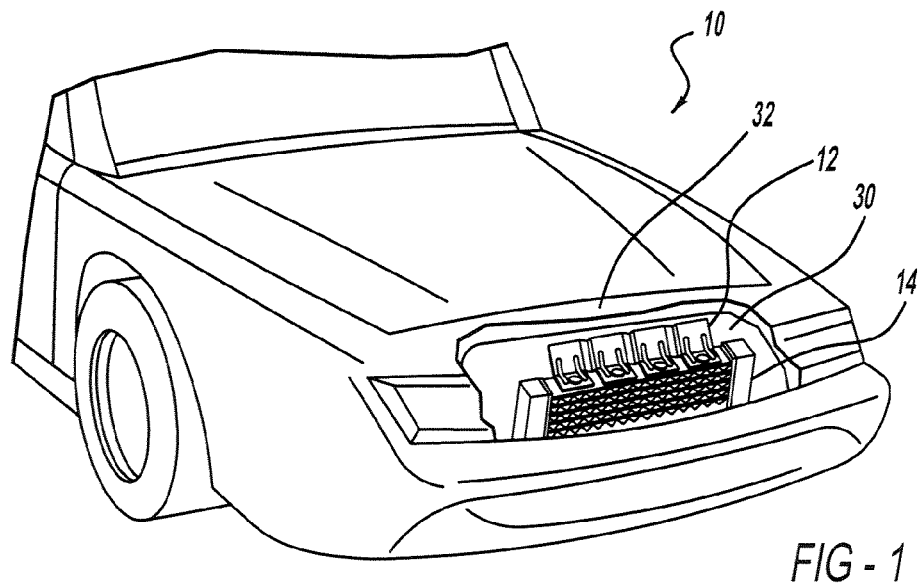
FIG. 1 is a front perspective view of a vehicle depicting a location of a thermal expansion resistant heat exchanger seal in accordance with the present disclosure.
Figure 2:
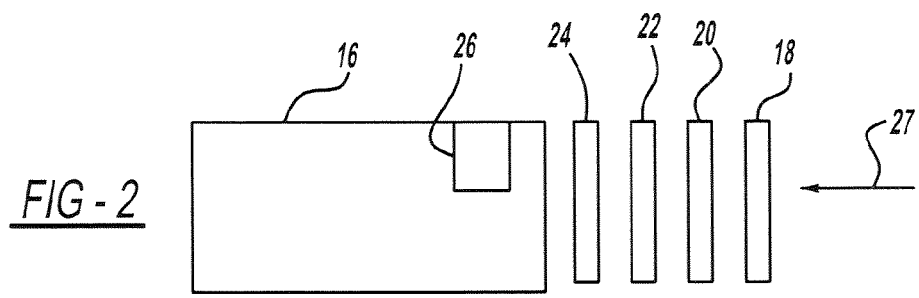
FIG. 2 is a diagram of an example arrangement of heat exchanger components in accordance with the present disclosure.
Figure 3:
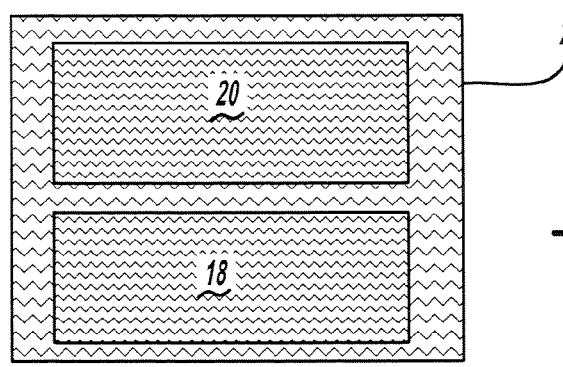
FIG. 3 is a front view of an example arrangement of heat exchanger components in accordance with the present disclosure.

Example embodiments will now be described more fully with reference to FIGS. 1-11 of the accompanying drawings. FIG. 1 is a front perspective view of a vehicle 10 depicting a location of a thermal expansion resistant heat exchanger seal 12 mounted to a heat exchanger 14. FIG. 2 depicts an example arrangement of an internal combustion engine 16 and numerous heat exchangers, any of which may be equipped with a thermal expansion resistant heat exchanger seal, as will be explained later. More specifically, arranged serially in front of engine 16 may be an air conditioning condenser 18, a charge air cooler 20, and an engine radiator 22, all of which are heat exchangers, and a fan 24. As is known, charge air cooler 20 may work in cooperation with a turbo charger 26. While FIG. 2 depicts heat exchangers 18, 20 and 22 arranged serially, with respect to a direction of airflow 27, heat exchangers 18, 20 and 22 may be arranged or "stacked" one on top of another. More specifically, as depicted in FIG. 3, arranged in front of engine radiator 22 may be charge air cooler 20 located above or stacked upon condenser 18.

Figure 4:
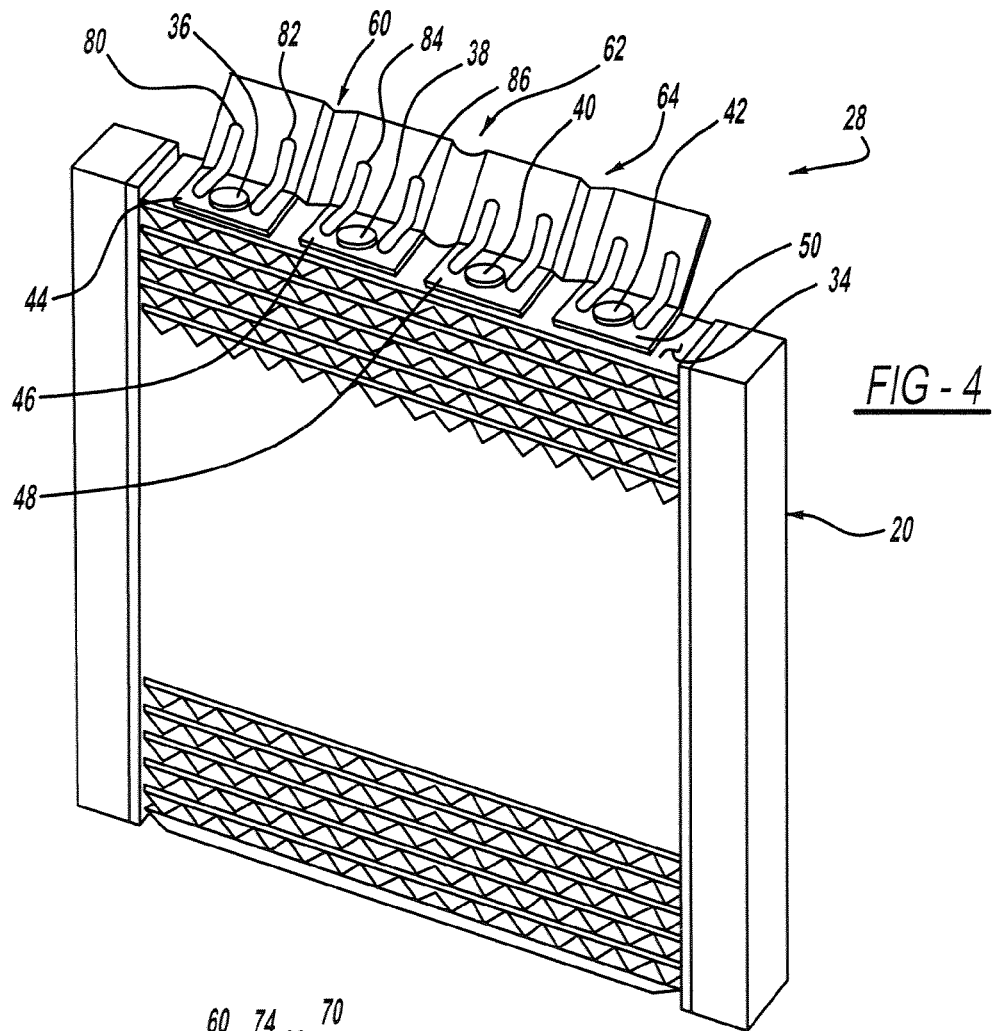
FIG. 4 is a perspective view of a heat exchanger equipped with a thermal expansion resistant heat exchanger seal in accordance with the present disclosure.

FIG. 4 depicts one embodiment of the present disclosure in which a thermal expansion resistant heat exchanger seal 28 ("seal 28") is mounted to a heat exchanger, such as charge air cooler 20. When thermal expansion resistant heat exchanger seal 28 is mounted to charge air cooler 20, charge air cooler 20 may be arranged as depicted in FIG. 3, for example. Thus, reverting back to FIG. 1, with such an arrangement, gap 30 defined between charge air cooler 20 and a body component 32 of vehicle 10 may be closed or blocked by thermal expansion resistant heat exchanger seal 28. An advantage of thermal expansion resistant heat exchanger seal 28 located atop charge air cooler 20 or any heat exchanger at such a location, is that airflow that might otherwise pass through gap 30 is prevented from bypassing or flowing around charge air cooler 20 via gap 30 and instead is forced to flow through charge air cooler 20 and any additionally arranged heat exchangers, thus increasing airflow through charge air cooler 20 and increasing efficiency of turbo charger 26 and engine 16, for example. Continuing with FIG. 4 and introducing FIG. 5, thermal expansion resistant heat exchanger seal 28 may, as an example, be attached or connected to a top surface 34 of charge air cooler 20. More specifically, seal 28 may be riveted, screwed, pinned in an interference fit, spot-welded, etc. to charge air cooler 20 at locations 36, 38, 40, 42 for example. Attachment at other locations of flaps 44, 46, 48, 50 of seal 28 is possible.

Figure 5:
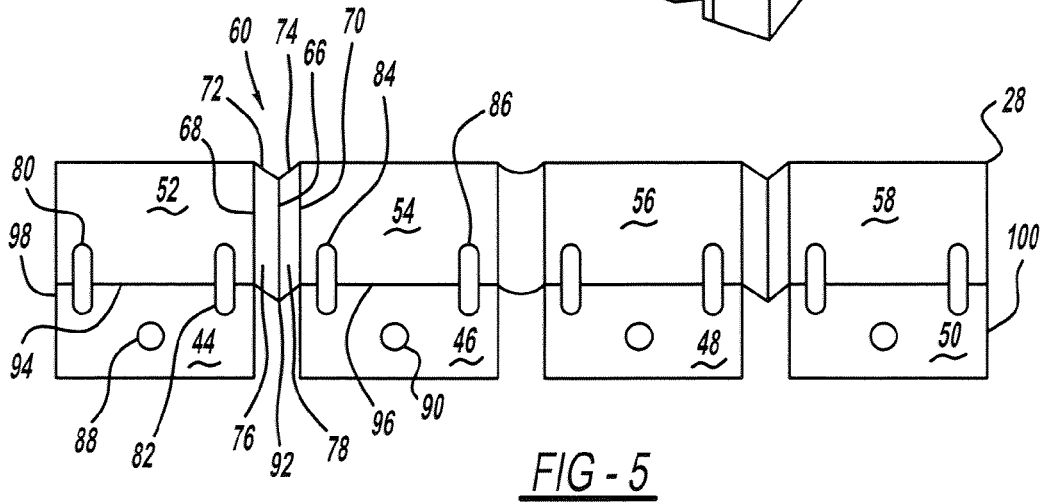
FIG. 5 is a front view of the thermal expansion resistant heat exchanger seal of FIG. 4 in accordance with the present disclosure.

Continuing with FIGS. 4 and 5, seal 28 may be equipped with tabs 44, 46, 48, 50 that are substantially the same and air deflector portions 52, 54, 56, 58 that are also substantially the same. Any number of corresponding tabs and air deflector portions may be provided as part of seal 28, depending upon the size of heat exchanger to which seal 28 is attached. Because seal 28 may be a series of tabs and air deflector portions, operation of which is substantially the same, only air deflector portions 52, 54 and tabs 44, 46 will be discussed. Similarly, because seal 28 may also employ a series of accordion portions 60, 62, 64, such as accordion portion 60 between a pair of air deflector portions 52, 54, operation of accordion portion 60 will primarily be discussed.

Accordion portion 60 may be a foldable portion about a crease 66, which may also be referred to as a pivot point. However, accordion portions do not have to have a pointed crease nor have a single pivot point or foldable portion. Thus, accordion portion(s) may have the geometry as depicted in FIGS. 4-7 and may also be shaped in a "W" or have multiple folds, a "wave" type of form, such as a sinusoidal wave form having multiple periods, and even multiple periods with a variety of different "frequencies." Accordion portions may further take on the shape of an "S" having any number of curves. Sawtooth configurations are conceivable with any number of "teeth." However, for ease of discussion, accordion portion(s) may be referred to as that depicted as accordion portion 60 in FIG. 5, with an edge for a crease portion.

Crease 66 may equally divide (e.g. bifurcate) accordion portion 60. That is, crease 66 may divide accordion portion 60 into two halves of equal surface area. More specifically, crease 66 may divide accordion portion 60 into accordion half 72 and accordion half 74, such that a surface area of a surface 76 of accordion half 72 and a surface area of a surface 78 of accordion half 78 are equal. Crease 68 may be a dividing and pivot point between accordion half 72 and air deflector 52 and crease 70 may be a dividing and pivot point between accordion half 74 and air deflector 54. Similarly, crease 68 and crease 70 may be located equidistantly from, and on opposite sides of, crease 66. Crease 66, crease 68 and crease 70 may be parallel. To provide strength to seal 28, impressions 80, 82, 84, 86 may be stamped or formed into seal 28, such as in air deflectors 52, 54 and their corresponding tabs 44, 46 as opposed to separate pieces that may be attached by welding or bolting. Corresponding impressions may be similarly located in air deflectors 56, 58 and their corresponding tabs 48, 50. Seal 28 may be fabricated from steel, stainless steel, aluminum or other suitable metal or plastic. Each flap, such as flaps 44, 46 may have holes 88, 90 drilled, punched, etc. into them to facilitate attachment to heat exchanger 20. Thus, holes 88, 90 may each be occupied by a different post, as depicted at locations 36, 38 in FIG. 4. Such posts may protrude through holes 88, 90.

With continued reference to FIGS. 4 and 5, in operation on a vehicle, as heat exchanger 20 becomes warmer, locations 36, 38 of heat exchanger 20, may begin to move farther apart from each other due to heat expansion of the material from which heat exchanger is fabricated. Because accordion portion 60 is equipped with folds or creases 66, 68, 70, accordion portion may expand to accommodate separation of holes 88, 90, which may be filled with posts 36, 38, which may be rigidly fixed into surface 34 of heat exchanger 20. Thus, during warming, surfaces 76, 78 move farther apart from each other. Upon cooling from a warmed or elevated temperature condition, accordion portion 60 may begin to contract when locations 36, 38 move closer together as heat exchanger 20 cools. Thus, during cooling, surfaces 76, 78 move closer together to each other. In expanding and contracting, a bottom edge 92 of accordion portion 60 may maintain alignment as a straight line with a crease 94 or fold between tab 44 and air deflector 52 and with a crease 96 or fold between tab 46 and air deflector 54 from a first end 98 to a second end 100 of seal 28.

Figure 6:
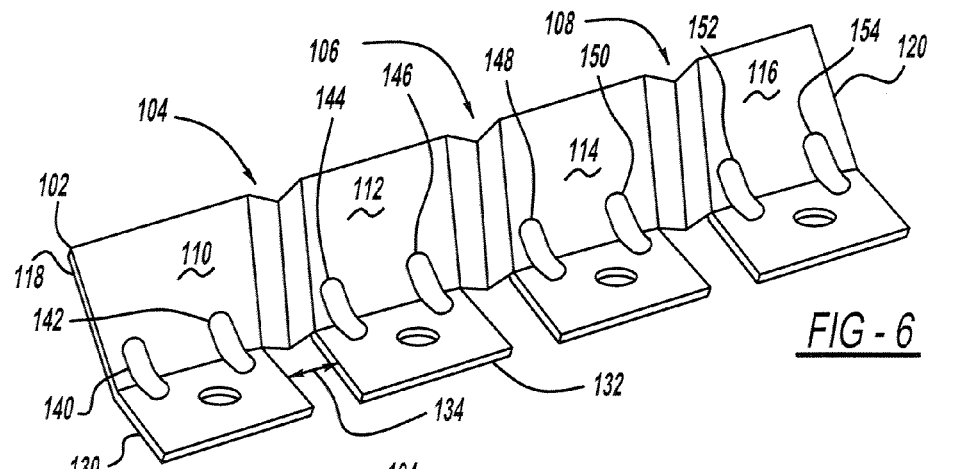
FIG. 6 is a perspective view a thermal expansion resistant heat exchanger seal in accordance with the present disclosure.
Figure 7:
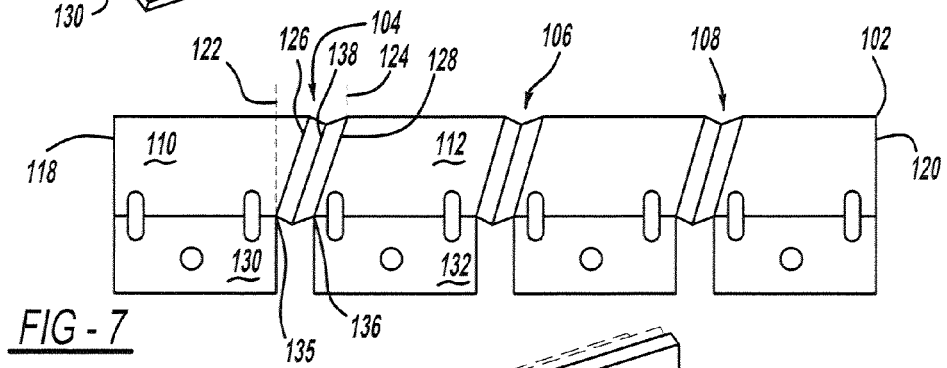
FIG. 7 is a front view of the thermal expansion resistant heat exchanger seal of FIG. 6 in accordance with the present disclosure.

FIGS. 6 and 7 depict a thermal expansion resistant heat exchanger seal 102 ("seal 102"), which although not depicted, may be mounted to a heat exchanger, such as charge air cooler depicted in FIG. 4. Seal 102 may be the same as seal 28 with the exception of accordion portions 104, 106, 108 and air deflectors 110, 112, 114, 116. As depicted, air deflectors 110-116 may be slanted or angled relative to ends 118, 120 of seal 102. Accordion portions 104, 106, 108 may be tilted to provide strength or rigidity in more than one direction and over a larger surface area of air deflectors 110, 112, which may be located next to each other. More specifically, and with reference to accordion portion 104 located between air deflectors 110, 112, by slanting accordion portion 104, strength may be provided to at least the area of air deflectors 110, 112 bounded by or between dashed line 122 and dashed line 124. Thus, such bounded area may be larger than an area bounded by crease 126 and crease 128 if creases 126, 128 were made parallel to ends 118, 120 assuming distance 134 between flap 130 and flap 132 is maintained and crease 126 maintains its origination point 135 and crease 128 maintains its origination point 136.

Similar to seal 28, seal 102 may have a crease 138 located parallel to and equidistant from each of crease 126 and crease 128. Accordion portions 104, 106, 108 function in a similar manner to accordion portions 60, 62, 64 previously described. A heat exchanger to which seal 102 is mounted undergoes expansion and contraction due to thermal events such as heating and cooling. Similar to seal 28, seal 102 may be equipped with stamped-in or pressed-in impressions 140, 142, 144, 146, 148, 150, 152, 154 to provide additional strength to seal 102 to better resist forces due to flowing air directed against air deflectors 110, 112, 114, 116 as vehicle 10 equipped with seal 102 moves along a road. Thus, seal 102 depicted in FIGS. 6 and 7 may provided greater strength and resistance to airflow to better direct air through heat exchanger 20.

Figure 8:
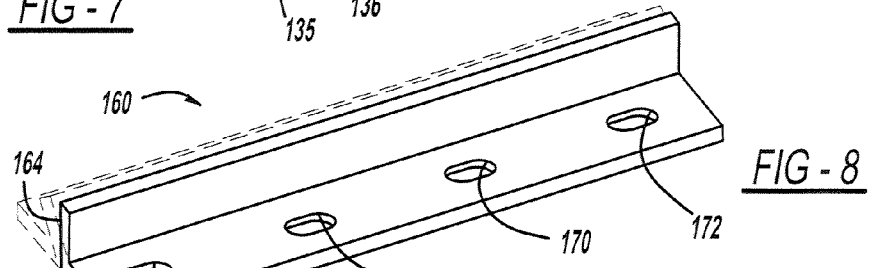
FIG. 8 is a perspective view of a thermal expansion resistant heat exchanger seal in accordance with the present disclosure.
Figure 9:
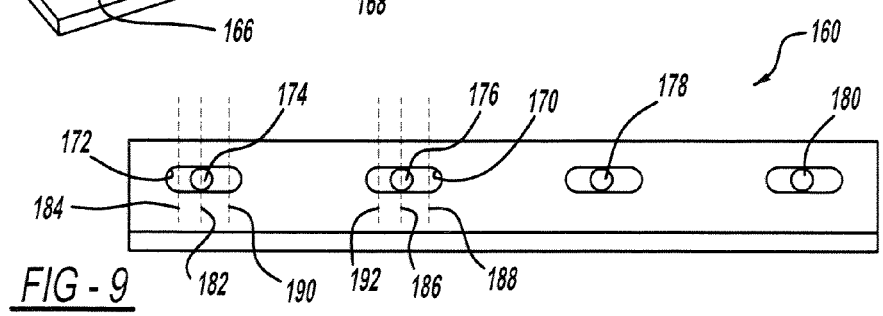
FIG. 9 is a top view of a thermal expansion resistant heat exchanger seal in accordance with the present disclosure.
Figure 11:
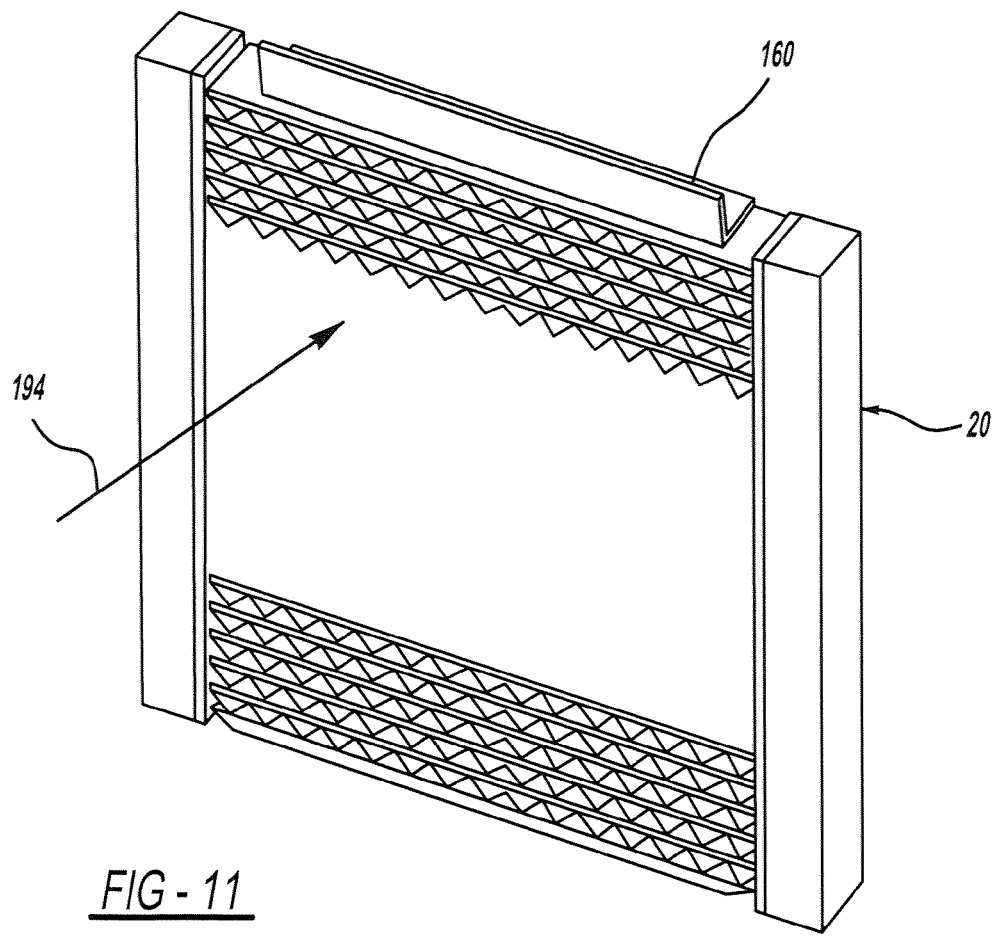
FIG. 11 is a perspective view of the thermal expansion resistant heat exchanger seal of FIGS. 8 and 9 in accordance with the present disclosure installed on a heat exchanger.

FIGS. 8 and 9 depict another embodiment of a thermal expansion resistant heat exchanger seal 160 ("seal 160") in accordance with the present disclosure and FIG. 11 depicts seal 160 installed upon a heat exchanger, such as charge air cooler 20. More specifically, seal 160 may be an L-shaped bracket, or similarly shaped bracket, with a horizontal portion 162 and a vertical portion 164 that together may form a right angle; however, as depicted in FIG. 8, vertical portion 164 may not necessarily be "vertical" and may form nearly any angle with horizontal portion 162 to accommodate surrounding vehicle structure. Horizontal portion 162, which may also be called a base portion, is so called because its position may be horizontal or parallel to the ground upon which a vehicle may reside when seal 160 is installed upon heat exchanger 14, within vehicle 10. However, horizontal portion may not necessarily be horizontal to the ground depending upon the structure to which horizontal portion 162 is mounted. Vertical portion 164 is so called because its position is vertical or perpendicular relative to the ground upon a vehicle resides when seal 160 is installed upon a heat exchanger 14, for example, within vehicle 10. Horizontal portion 162 may be equipped with a number of slots 166, 168, 170, 172 to permit movement relative to a respective pin 174, 176, 178, 180 installed within each slot.

Figure 10:
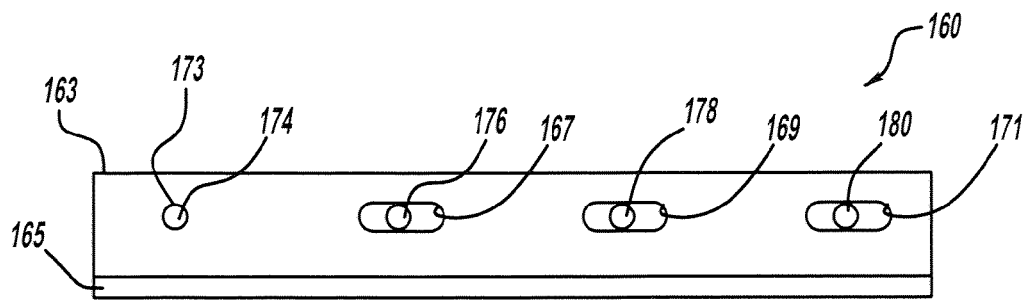
FIG. 10 is a top view of a thermal expansion resistant heat exchanger seal in accordance with the present disclosure.

FIG. 10 depicts another embodiment of a thermal expansion resistant heat exchanger seal 161 ("seal 161") in accordance with the present disclosure. More specifically, seal 161 may be an L-shaped bracket with a base portion 163 and an upright portion 165 that together may or may not form a right angle. That is, similar to the embodiment depicted in FIG. 8, upright portion 165 may not necessarily be vertical and may form nearly any angle with base portion 163 to accommodate surrounding vehicle structure and close an air gap. Base portion 163 may be horizontal or parallel to the ground upon which a vehicle resides when seal 161 is installed upon a heat exchanger 14, for example, within vehicle 10. However, base portion 161 may not necessarily be positioned horizontal to the ground depending upon the structure to which base portion 163 is mounted. Upright portion 165 may be positioned at a non-ninety degree angle or perpendicular relative to the ground upon which a vehicle resides when seal 161 is installed upon a heat exchanger 14, for example, within a vehicle. Base portion 163 may be equipped with a number of slots 167, 169, 171, to permit movement relative to respective pins 176, 178, 180 installed within each slot. However, seal 161 may be constructed with one round hole 173 to accommodate a round pin 174 in an interference type of fit, for example. With such an arrangement, expansion and contraction of the material of seal 161 will be relative to pin 174, thus providing the advantage of a controlled expansion and contraction about pin 174.

Movement of pins fixed within a heat exchanger relative to a corresponding seal will now be explained. FIG. 9 depicts pin 174 and pin 176 which may be fixedly mounted within a top surface 34 (FIG. 4) of heat exchanger 20. When heat exchanger 20 experiences an increase in temperature that causes the material of heat exchanger 20 to expand, pin 174 may move from location indicated by line 182 to a location indicated by line 184, while at the same time, pin 176 may move from a location indicated by line 186 to a location indicated by line 188. Similarly, when heat exchanger 20 experiences a decrease in temperature that causes the material of heat exchanger 20 to contract, pin 174 may move from location indicated by line 182 to a location indicated by line 190, while at the same time, pin 176 may move from a location indicated by line 186 to a location indicated by line 192. Thus, because of movement of pins 174-180 in accordance with the representative example noted above, horizontal portion 162 may be equipped with slots 166-172. More specifically, slot 172 is sized to permit movement of pin 174 and slot 170 is sized to permit movement of pin 176 over a full range of temperatures to which heat exchanger 20 may be exposed. Pins 174-180 may be capped with a cotter pin or other suitable device to prevent seal 160 from dislodging. Thus, with installation of seal 160 upon heat exchanger 20, airflow 194 may be prevented from flowing above heat exchanger 20, such as between heat exchanger 20 and a body component 32, thus increasing airflow through heat exchanger 20 and increasing efficiency of turbo charger 26 and engine 16, for example.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A single piece seal member comprising:
    a plurality of tabs, each tab being configured to be separately mounted directly to a heat exchanger;
    a plurality of deflector portions, each deflector portion extending from a corresponding one of the plurality of tabs in an extending direction and manipulating a flow of fluid proximate the heat exchanger; and
    an expansion portion disposed between and directly interconnecting each pair of adjacent deflector portions and expandable in response to exposure to heat between a first position at which the adjacent deflector portions are a first distance apart from each other and a second position at which the adjacent deflector portions are a second distance apart from each other, the second distance being less than the first distance; wherein
    each expansion portion is fixedly attached to each of a respective pair of adjacent deflector portions.

2. The seal member of claim 1, wherein the expansion portion includes a shape selected from the group consisting of a V-shape, a W-shape, an S-shape, and a wave shape.

3. The seal member of claim 1, wherein the expansion portion includes a crease substantially bifurcating the expansion portion.

4. The seal member of claim 1, wherein each of the deflector portions include a generally upstream-facing surface and a generally downstream-facing surface, and at least one of the deflector portions includes an impression formed in the upstream-facing surface.

5. The seal member of claim 1, wherein the expansion portion is substantially aligned with a space between adjacent tabs.

6. The seal member of claim 1, wherein the expansion portion extends away from said base portion at a first angle in a first dimension relative to a space between adjacent tabs and at a second angle in a second dimension relative to the space between the adjacent tabs.

7. The seal member of claim 1, wherein each of the tabs is fixed to the heat exchanger at a corresponding one of a plurality of attachment locations.

8. An assembly comprising:
    a heat exchanger; and
    the seal member according to claim 1.

9. A vehicle comprising:
    a source of rotary motive power propelling the vehicle;
    a heat exchanger disposed between the source of rotary motive power and a front end of the vehicle;
    a body component at least partially housing the heat exchanger and cooperating with the heat exchanger to define a gap therebetween; and
    the seal member according to claim 1.

10. The seal member of claim 1, wherein the expansion portion is fixedly attached to only each of the respective pair of adjacent deflector portions.

11. The seal member of claim 1, wherein the only components mounted directly to the heat exchanger are the plurality of tabs.

12. The seal member of claim 1, wherein an overall width of each of the plurality of tabs in a direction perpendicular to the extending direction is equal to an overall width of a respective deflector portion in the direction perpendicular to the extending direction.

13. The seal member of claim 1, wherein the only connection between each pair of adjacent deflector portions is the expansion portion.

14. The assembly of claim 8, wherein the heat exchanger includes at least one of an air conditioning condenser, a charge air cooler, and an engine radiator.

15. The assembly of claim 8, wherein the expansion portion includes an accordion portion expandable and contractible in response to changes in temperature surrounding the heat exchanger.

16. The vehicle of claim 9, wherein the heat exchanger includes at least one of an air conditioning condenser, a charge air cooler, and an engine radiator.

17. The seal member of claim 10, wherein the only components mounted directly to the heat exchanger are the plurality of tabs.

* * * * *